(12) United States Patent
Yu

(10) Patent No.: US 8,100,440 B2
(45) Date of Patent: Jan. 24, 2012

(54) BATTERY COVER LATCH MECHANISM

(75) Inventor: Tao Yu, Shenzhen (CN)

(73) Assignees: ShenZhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 345 days.

(21) Appl. No.: 12/477,214

(22) Filed: Jun. 3, 2009

(65) Prior Publication Data

US 2010/0039757 A1 Feb. 18, 2010

(30) Foreign Application Priority Data

Aug. 13, 2008 (CN) .......................... 2008 1 0303719

(51) Int. Cl.
*E05C 5/00* (2006.01)
*E05C 5/02* (2006.01)
(52) U.S. Cl. ........ 292/5; 292/57; 292/247; 292/DIG. 11
(58) Field of Classification Search ................ 292/5, 57, 292/58, 246–250, DIG. 11
See application file for complete search history.

(56) References Cited

U.S. PATENT DOCUMENTS

| | | | | |
|---|---|---|---|---|
| 2,733,830 | A * | 2/1956 | Ruskin | 220/840 |
| 4,470,623 | A * | 9/1984 | Judge, Jr. | 292/58 |
| 4,672,510 | A * | 6/1987 | Castner | 361/679.32 |
| 5,969,245 | A * | 10/1999 | Chiang | 73/431 |
| 6,099,097 | A * | 8/2000 | Hocker et al. | 312/327 |
| 6,373,692 | B1 * | 4/2002 | Cheng | 361/679.59 |
| 6,381,145 | B1 * | 4/2002 | Chen et al. | 361/752 |
| 7,121,637 | B2 * | 10/2006 | Fang | 312/223.2 |
| 7,612,993 | B1 * | 11/2009 | Takei et al. | 361/679.31 |
| 7,643,287 | B2 * | 1/2010 | Sung et al. | 361/679.58 |
| 2006/0226174 | A1 * | 10/2006 | Lin | 222/321.1 |
| 2009/0260294 | A1 * | 10/2009 | Sullivan | 49/394 |

* cited by examiner

*Primary Examiner* — Carlos Lugo
(74) *Attorney, Agent, or Firm* — Altis Law Group, Inc.

(57) ABSTRACT

A battery cover latch mechanism is provided including a cover member having a pivoting assembly formed thereon, and a housing member. The housing member defines a mounting section. The pivoting assembly is configured to be either pivotably mounted within the mounting section when the cover member is rotated relative to the housing member at an angle less than 90 degrees, or detached from the mounting section when the cover member is rotated relative to the housing member at an angle equal to 90 degrees.

4 Claims, 8 Drawing Sheets

BATTERY COVER LATCH MECHANISM

BACKGROUND

1. Technical Field

The present disclosure relates to battery cover latch mechanisms used in portable electronic devices.

2. Description of Related Art

Portable electronic devices usually include latch mechanisms used to latch battery covers to housings. The latch mechanisms must tolerate frequent installation and removal of batteries relative to the housings.

A typical battery cover latch mechanism includes at least one spring to facilitate the operation thereof. However, the spring may easily wear out after repeated operations and, thus the battery cover latch mechanism may fail.

Therefore, there is chamber for improvement within the art.

BRIEF DESCRIPTION OF THE DRAWINGS

Many aspects of the new housing and method for fabricating the same can be better understood with reference to the following drawings. The components in the drawings are not necessarily drawn to scale, the emphasis instead being placed upon clearly illustrating the principles of the new housing and method for fabricating the same. Moreover, in the drawings, like reference numerals designate corresponding parts throughout the several views.

DETAILED DESCRIPTION

Figure 1:
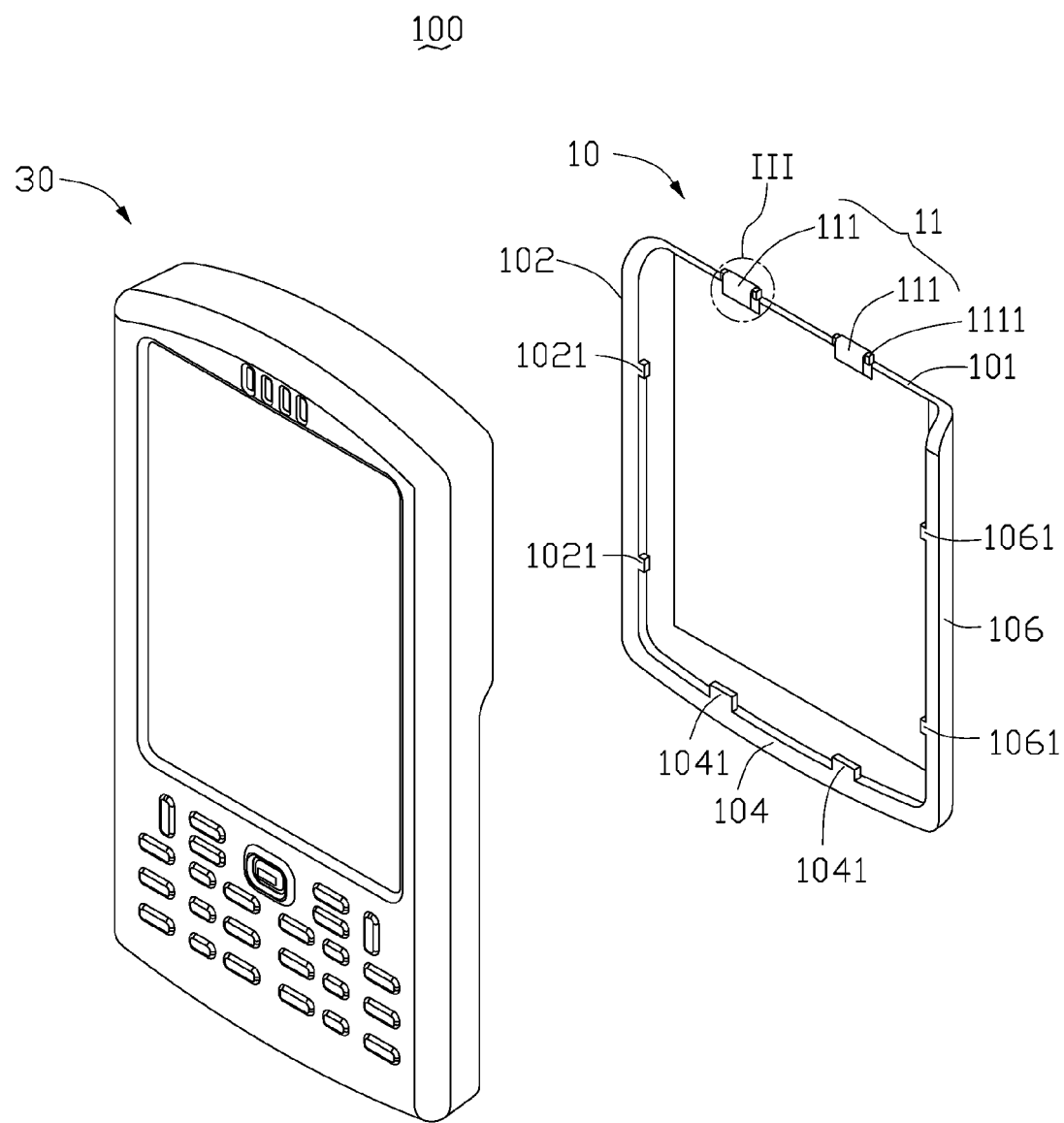
FIG. 1 is an exploded, isometric view of a battery cover latch mechanism according to an exemplary embodiment.
Figure 2:
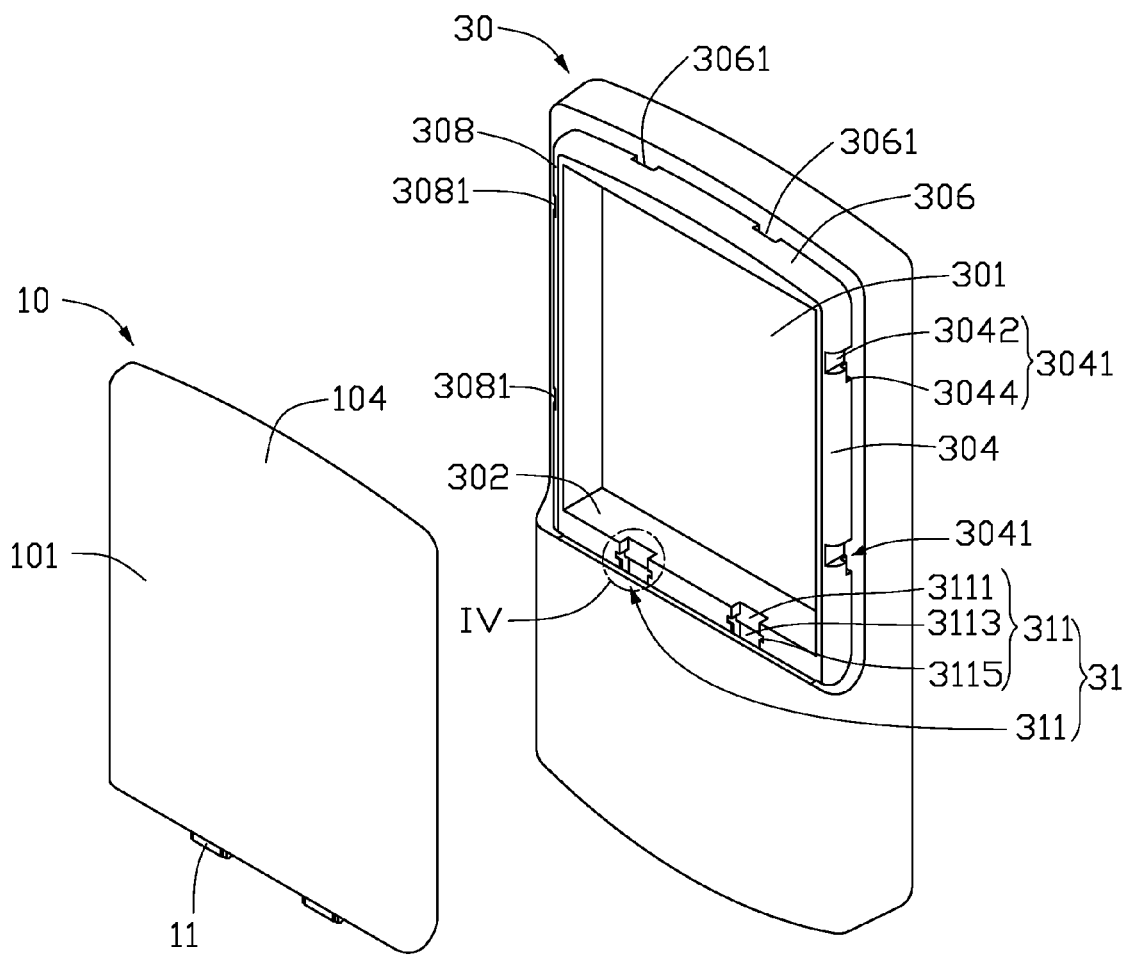
FIG. 2 is another view of the battery cover latch mechanism shown in FIG. 1 from another angle.

FIGS. 1 and 2 show an exemplary battery cover latch mechanism 100 including a cover member 10 and a housing member 30. The cover member 10 includes a cover body 101, of which three connected sides have three continuously connected side edges, i.e., a first side edge 102, a second side edge 104 and a third side edge 106. The first side edge 102 and the third side edge 106 have two spaced first latching blocks 1021 and two spaced second latching blocks 1061 formed respectively. The second side edge 104 includes two spaced protruding blocks 1041.

Figure 3:
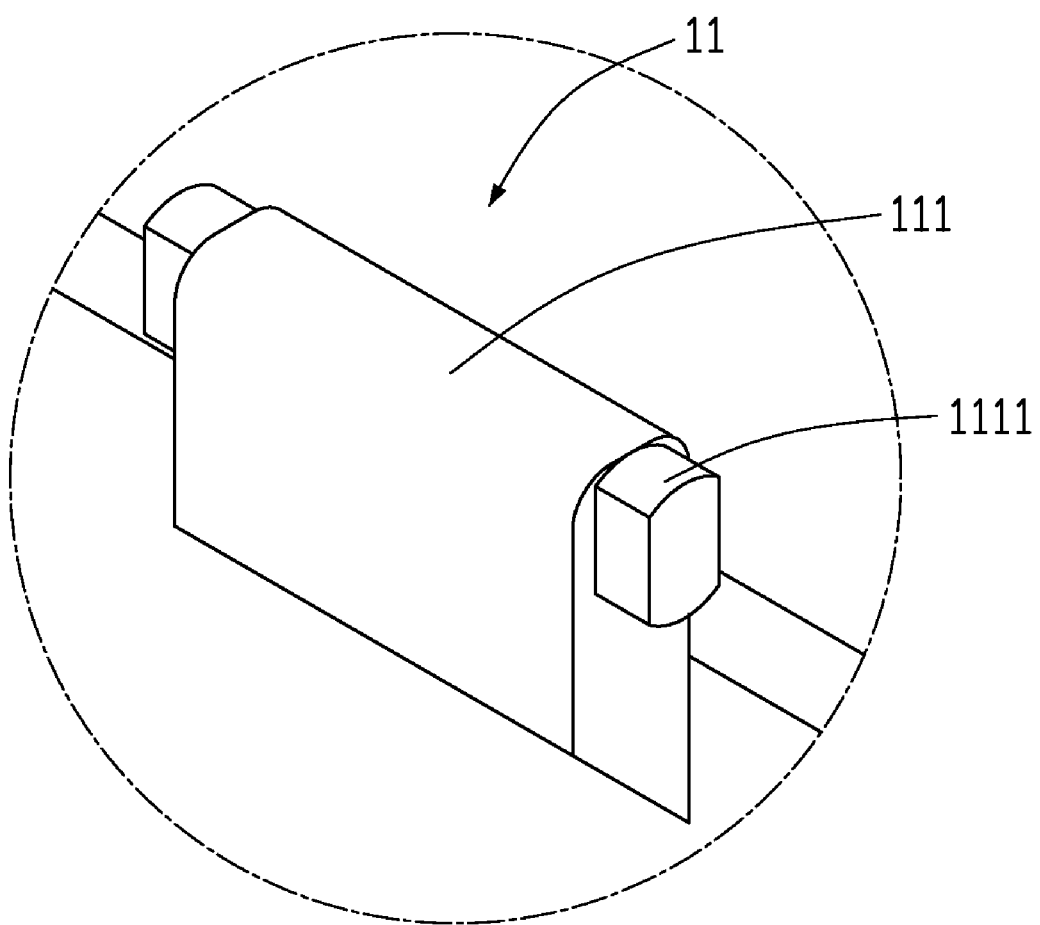
FIG. 3 is an enlarged view of III-III section illustrated in FIG. 1.

The free side of the cover body 101 has a pivoting assembly 11 formed thereon. The pivoting assembly 11 includes two pivot blocks 111 protruding on the interior surface of the cover body 101. Referring further to FIG. 3, the pivot block 111 has two extension blocks 1111 extending from the pivot block 111 in two opposite directions. Each extension block 1111 includes two opposite arcuate surfaces and two opposite planar surfaces.

Referring to FIG. 2, the housing member 30 defines a battery chamber 301 which is enclosed by four continuously connected sidewalls, i.e., a first sidewall 302, a second sidewall 304, a third sidewall 306 and a fourth sidewall 308.

Figure 4:
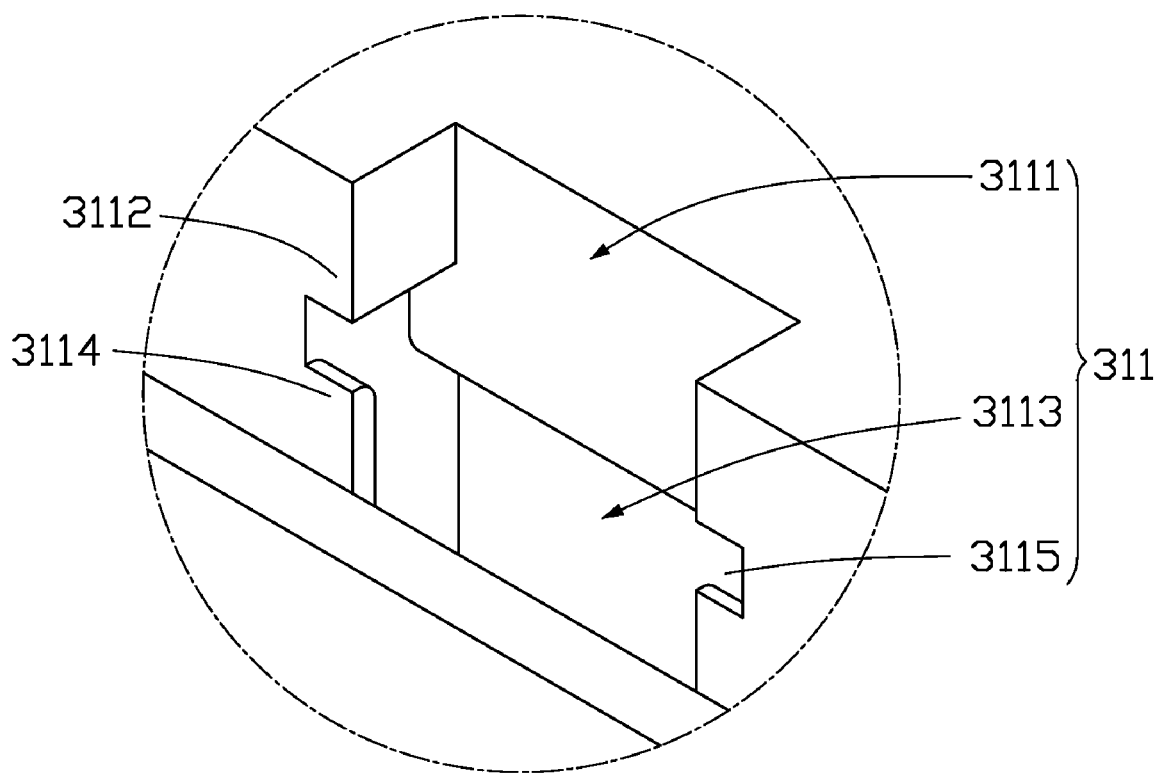
FIG. 4 is an enlarged view of IV-IV section illustrated in FIG. 2.

The first sidewall 302 includes a mounting section 31, in which two receiving grooves 311 are defined corresponding to the two pivot blocks 111. Referring further to FIG. 4, the receiving groove 311 is stepped including a first groove portion 3111, and a second groove portion 3113 communicating with the first groove portion 3111. Accordingly, the first groove portion 3111 has two opposite limiting blocks 3112 formed therein. The second groove portion 3113 has two opposite limiting boards 3114 formed therein. The limiting boards 3114 align with the limiting blocks 3112 to cooperatively define two insertion slots 3115 respectively. The extension blocks 1111 of the pivot block 111 is configured to be inserted into the two insertion slots 3115 and then slide into the second groove portion 3113 during latching of the cover member 10 to the housing member 30.

Referring back to FIG. 2, the second sidewall 304 defines two spaced first latching grooves 3041 corresponding to the two first latching blocks 1021. Each first latching groove 3041 is generally L-shaped including a guiding groove portion 3042 and a sliding groove portion 3044 communicating with the sliding groove portion 3044. The third sidewall 306 defines two spaced latching slots 3061 corresponding to the two protruding blocks 1041. The fourth sidewall 308 has substantially the same structure with the second sidewall 304 by defining two second spaced latching groove 3081 corresponding to the two second latching block 1061.

Figure 5:
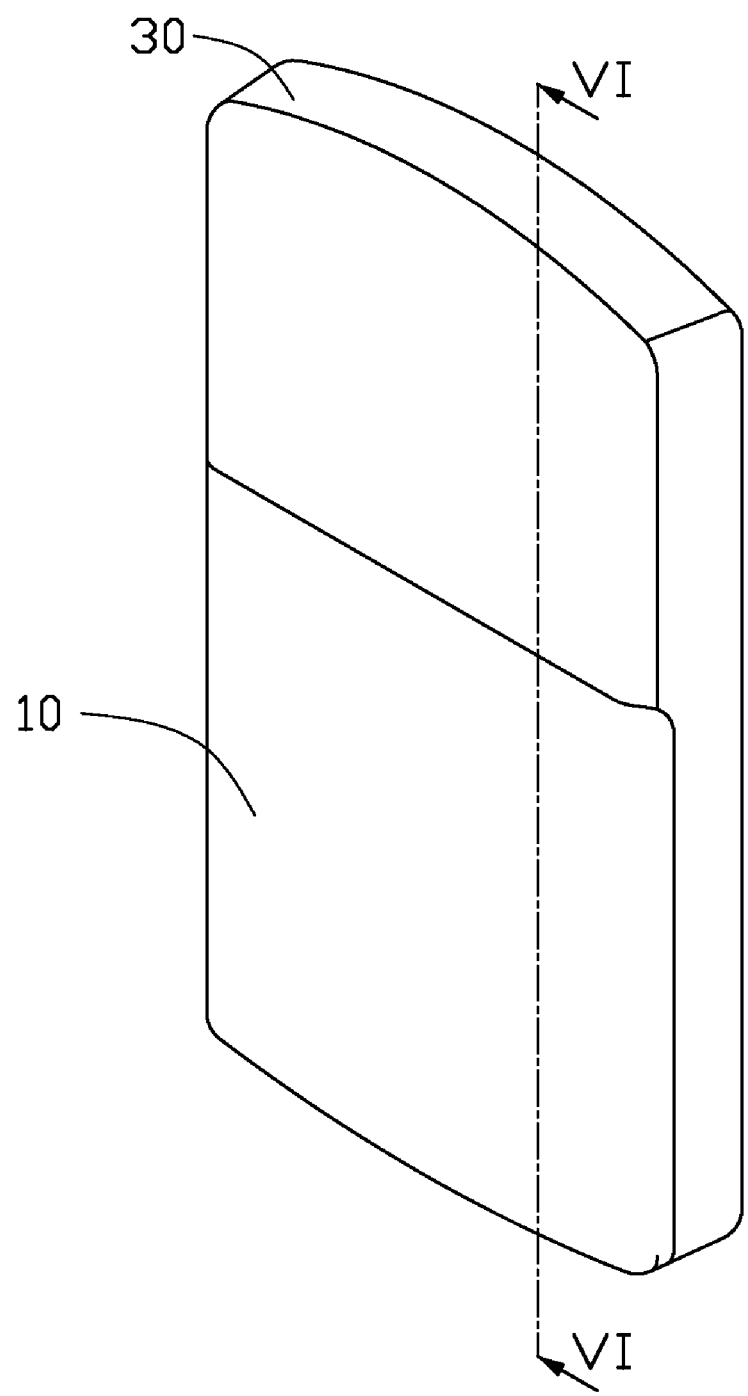
FIG. 5 is an assembled view of the battery cover latch mechanism shown in FIG. 1.
Figure 6:
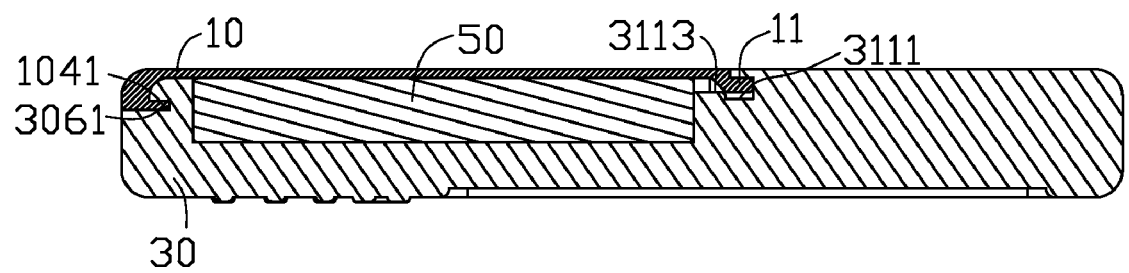
FIG. 6 is a cross-sectional view of the assembled battery cover latch mechanism shown in FIG. 5 along line VI-VI.

Referring to FIGS. 5 and 6, to latch the cover member 10 to the housing member 30, the extension block 1111 is inserted into the insertion slot 3115. At this time, a battery 50 can be placed into the battery chamber 301. The cover member 10 is then rotated towards the housing member 30. During this course, the first latching blocks 1021 and the second latching blocks 1061 slidably engage into the first latching grooves 3041 and the second latching grooves 3081. The latching block 1021 slides from the guiding groove portion 3042 into the sliding groove portion 3044 when the cover member 10 is pushed towards the mounting section 31. At this stage, the protruding blocks 1041 are latched into the latching slots 3061, and the cover member 10 is latched to the housing member 30.

Figure 7:
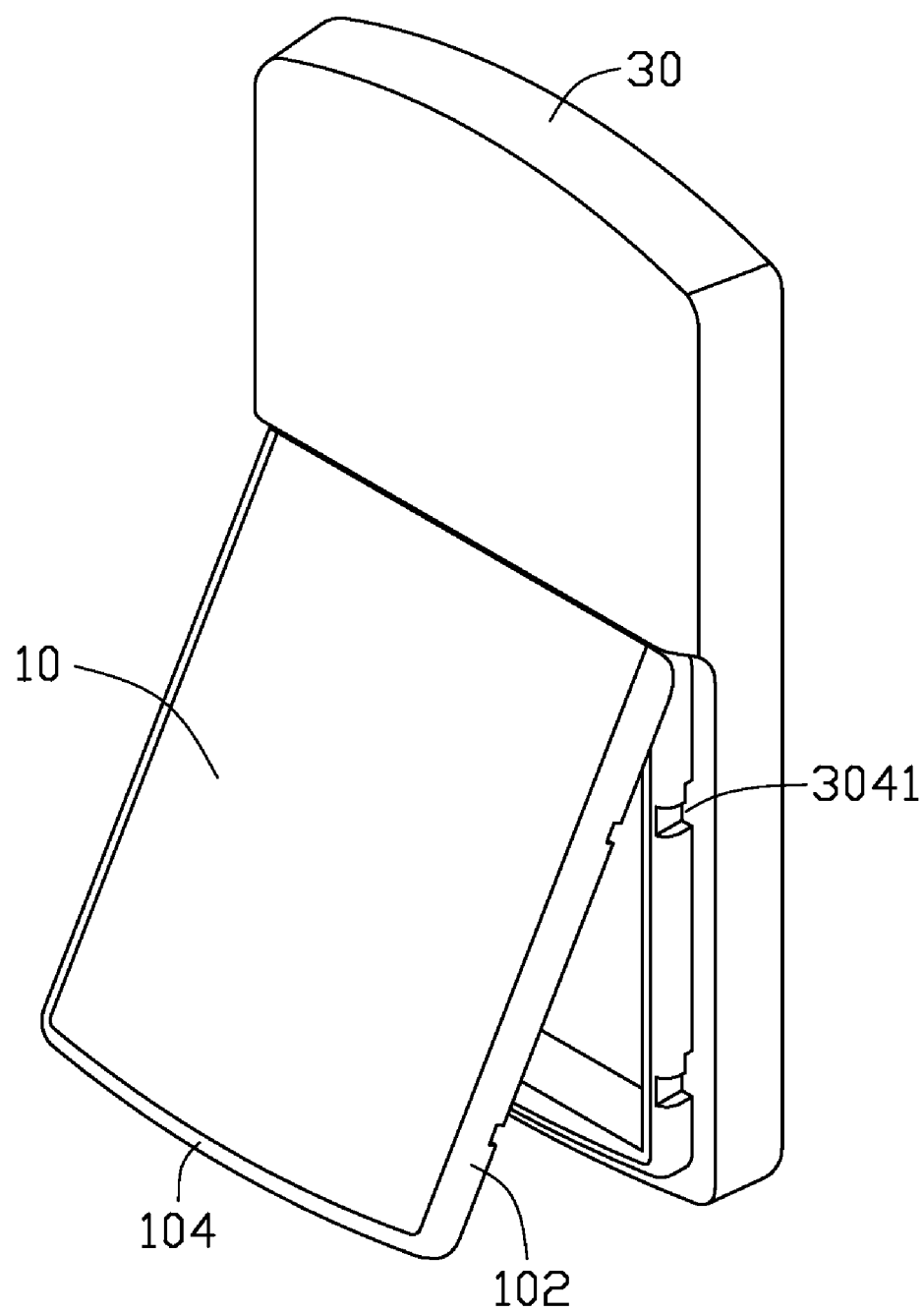
FIG. 7 is an isometric view of the battery cover latch mechanism at an angle less than 90 degree.
Figure 8:
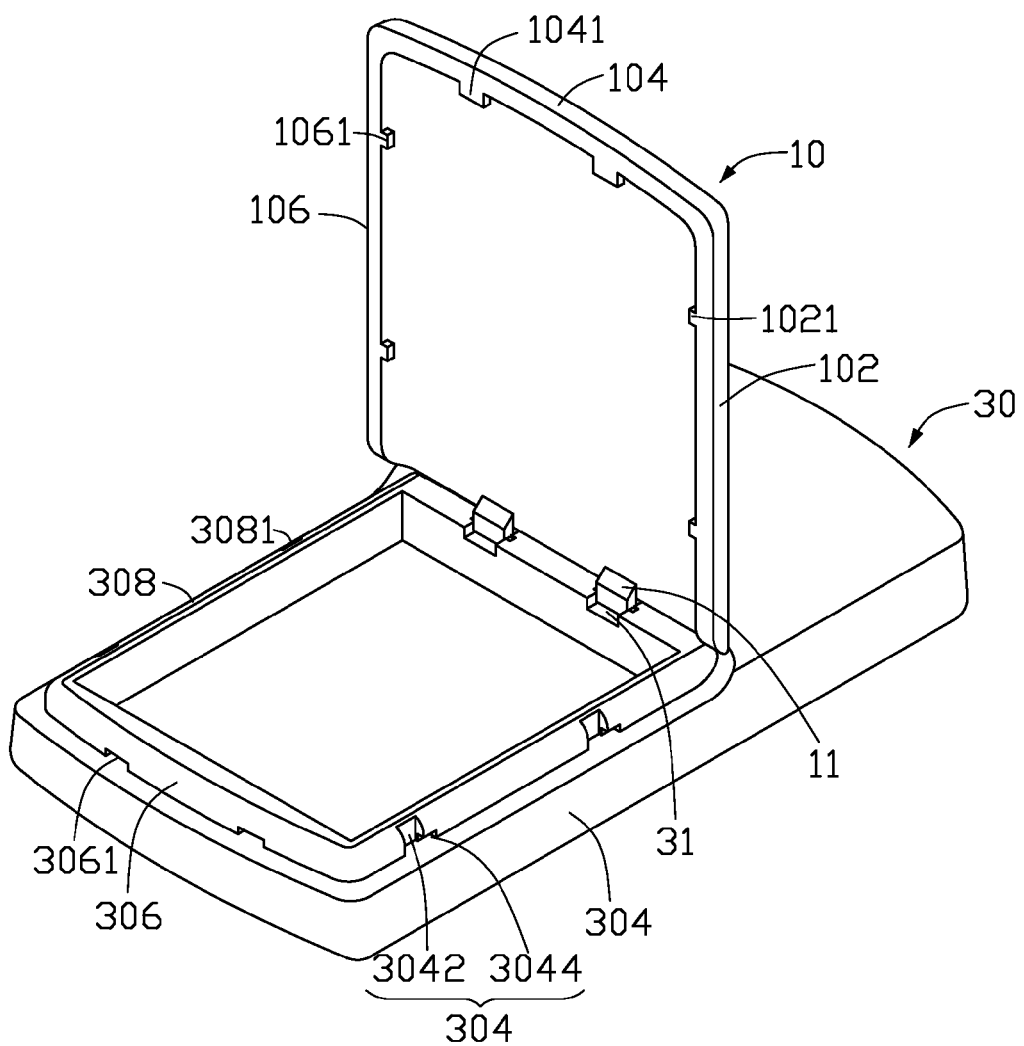
FIG. 8 is similar to FIG. 7 but at an angle of 90 degree.

FIGS. 7 and 8 show an unlatching process reverse to the latching process shown in FIGS. 5 and 6. When the cover member 10 is rotated about the housing member 30 at an angle less than 90 degrees (see FIG. 7), the pivot block 111 and the extension block 1111 pivotably engage within the second groove portion 3113 and cannot slide out of the second groove portion 3113 due to the limiting boards 3114. When the cover member 10 is rotated perpendicular to the housing member 30, the extension blocks 1111 align with the insertion slots 3115 and accordingly, the cover member 10 can be detached from the housing member 30.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism, comprising:
   a cover member comprising a pivoting assembly, protruding blocks opposite to the pivoting assembly, and latching blocks;

a housing member defining a mounting section, latching slots corresponding to the protruding blocks, and latching grooves corresponding to the latching blocks, the pivoting assembly configured to be received in the mounting section, then rotated 90 degrees and then slidably relative to the mounting section so that the protruding blocks are latched into the latching slots, and the latching blocks are latched into the latching grooves;

the pivoting assembly comprising a pivot block formed on the cover member, the pivot block having two extension blocks oppositely extending therefrom, the mounting section defining two insertion slots configured for receiving the insertion of the extension blocks thereinto;

the mounting section comprising a receiving groove;

the receiving groove comprising a first groove portion and a second groove portion communicating with the first groove portion;

the first groove portion having two opposite limiting blocks formed therein;

the second groove portion having two opposite limiting boards formed therein; and the two insertion slots being defined by the limiting boards and the limiting blocks.

2. The battery cover latch mechanism as claimed in claim 1, wherein the pivot block and the extension block are configured to pivotably engage within the second groove portion and avoid sliding out of the second groove portion by resisting of the limiting boards, when the cover member is rotated about the housing member at an angle less than 90 degrees.

3. A battery cover latch mechanism, comprising:

a cover member having a pivoting assembly, protruding blocks opposite to the pivoting assembly, and latching blocks;

a housing member defining a mounting section, latching slots corresponding to the protruding blocks, and latching grooves corresponding to the latching blocks, the cover member configured to be rotated to latch or unlatch to the housing member in a latched position or unlatched position, from the unlatched position to the latched position, the pivoting assembly to be received in the mounting section, then rotated 90 degrees and then slidably relative to the mounting section so that the protruding blocks are latched into the latching slots, and the latching blocks are latched into the latching grooves;

the pivoting assembly comprising a pivot block formed on the cover member, the pivot block having two extension blocks oppositely extending therefrom, the mounting section defining two insertion slots configured for receiving the insertion of the extension blocks thereinto;

the mounting section comprising a receiving groove;

the receiving groove comprising a first groove portion and a second groove portion communicating with the first groove portion;

the first groove portion having two opposite limiting blocks formed therein;

the second groove portion having two opposite limiting boards formed therein; and the two insertion slots being defined by the limiting boards and the limiting blocks.

4. The battery cover latch mechanism as claimed in claim 3, wherein the pivot block and the extension block are configured to pivotably engage within the second groove portion and avoid sliding out of the second groove portion by resisting of the limiting boards, when the cover member is rotated about the housing member at an angle less than 90 degrees.

\* \* \* \* \*